(12) United States Patent
Zhong et al.

(10) Patent No.: US 10,935,183 B2
(45) Date of Patent: Mar. 2, 2021

(54) HANDLE

(71) Applicant: Getac Technology Corporation, Hsinchu County (TW)

(72) Inventors: Shi-Liang Zhong, Taipei (TW); Cheng-Hung Chiang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 22 days.

(21) Appl. No.: 16/373,940

(22) Filed: Apr. 3, 2019

(65) Prior Publication Data

US 2020/0318781 A1    Oct. 8, 2020

(51) Int. Cl.
    *G06F 1/16*      (2006.01)
    *F16M 11/10*      (2006.01)
    *F16M 13/02*      (2006.01)
    *A45F 5/00*      (2006.01)
    *F16M 13/00*      (2006.01)
    *A45F 5/10*      (2006.01)

(52) U.S. Cl.
    CPC .............. *F16M 13/005* (2013.01); *A45F 5/10* (2013.01); *F16M 11/10* (2013.01); *F16M 13/022* (2013.01); *G06F 1/1626* (2013.01); *G06F 1/1656* (2013.01); *A45F 2005/002* (2013.01); *A45F 2200/0525* (2013.01); *F16M 2200/065* (2013.01)

(58) Field of Classification Search
CPC .... F16M 13/005; F16M 13/022; F16M 11/10; F16M 220/065; A45F 5/10; A45F 2005/002; A45F 2005/1013; A45F 2005/1006; A45F 2200/0525; G06F 1/1626; G06F 1/1656
See application file for complete search history.

(56) References Cited

U.S. PATENT DOCUMENTS

| | | | |
|---|---|---|---|
| 4,364,150 A * | 12/1982 | Remington | A45C 13/26 16/409 |
| 7,712,590 B1 * | 5/2010 | Lee | A45C 13/26 16/110.1 |
| 9,052,873 B2 * | 6/2015 | Murakata | G06F 1/166 |
| 9,471,096 B2 * | 10/2016 | Kuo | F16M 11/00 |
| 9,930,795 B2 * | 3/2018 | Chang | H05K 5/023 |
| 9,980,548 B1 * | 5/2018 | Lai | A45C 13/26 |
| 10,019,037 B2 * | 7/2018 | Lee | G06F 1/1656 |
| 10,459,484 B2 * | 10/2019 | Ferren | A45C 11/00 |
| 2018/0049332 A1 * | 2/2018 | Chang | A45F 5/10 |

* cited by examiner

*Primary Examiner* — Anita M King
(74) *Attorney, Agent, or Firm* — Locke Lord LLP; Tim Tingkang Xia, Esq.

(57) ABSTRACT

The present invention provides a handle adapted to be pivotally configured on a mounting side of an electronic device, and includes a pair of rigid swing arms and an elastic band. The rigid arms are individually pivotally connected on the mounting side of the electronic device along a same pivot axis. The elastic band is connected between the rigid swing arms. When the electronic device is erected on a plane, the rigid swing arms can support the weight of the electronic device. When the electronic is hand-held by a user, the elastic band can be elastically deformed to adapt to a user palm in different sizes.

20 Claims, 11 Drawing Sheets

HANDLE

BACKGROUND OF THE INVENTION

Field of the Invention

The present invention relates to a handle for supporting an electronic device or for lifting and holding an electronic device, and more particularly to a rigid handle that can be partially elastically deformed.

Description of the Prior Art

A mounting side of a tablet computer in military regulations is pivotally provided with a handle for easy holding. In general, in addition for allowing a user to lift a tablet computer, the handle can also be used to support the tablet computer to erect the tablet computer on a table top. Thus, handles are mostly made of materials having higher rigidity to provide a sufficient support force. When a user holds the foregoing mounting side of a tablet computer, a user passes a palm thereof between a gap between the handle and the mounting side. However, larger palms of some users may fail to pass through the handle. If the gap between the handle and the mounting side is enlarged to adapt to users with larger palms, a user palm in a smaller size may not abut against the handle when the user holds the mounting side of the tablet computer such that the handle can be wobbly. As a result, the design of a handle of a current tablet computer in military regulations cannot be universally used for all users.

In view of the above, on the basis of extensive development with the practice of theories, the Inventor is targeted at an object of improving the above issues with respect of the above prior art.

SUMMARY OF THE INVENTION

The present invention provides a rigid handle that can be partially elastically deformed.

A handle provided by the present invention is adapted to be pivotally configured on a mounting side of an electronic device, and includes a pair of rigid swing arms and an elastic band. The rigid swing arms are individually pivotally connected on the mounting side of the electronic device along a pivot axis. The elastic band is connected between the rigid swing arms.

The elastic band of the handle of the present invention includes a plurality of blocks in a spaced arrangement, and a plurality of connecting sections respectively connected between adjacent blocks.

Two sides of the electronic device on which the handle of the present invention is mounted are a display surface and a back surface, respectively. The electronic device is provided with a stopping portion. When the handle is pivotally turned to locate at the back surface of the electronic device, the stopping portion is abutted against one of the rigid swing arms and thus fixes the position of the handle.

The pair of rigid swing arms of the handle of the present invention are individually embedded by means of dual material injection in the elastic band, and the elastic band can be radially deformed along the pivot axis by using the part that is not embedded in the pair of rigid swing arms. When the weight of the electronic device is applied on the handle, the elastic band maintains an original shape by using the pair of rigid swing arms.

One end of each rigid swing arms of the handle of the present invention is a pivot end. Each pivot end is pivotally connected to the electronic device, and the pair of the rigid swing arms bend and extend in opposite from the pivot ends to form respective support sections, and the elastic band extends and is connected between the pair of support sections. A protrusion is provided in a projecting manner on a side surface of each support section. A through holes is horizontally provided on at least one of support sections. Each support section is embedded by means of dual material injection in the elastic band. The elastic band can be radially deformed along the pivot axis by using the part that is not embedded in each support section. When the weight of the electronic device is applied on the handle, the elastic band maintains the original shape by using the support sections. Each protrusion projects from and is higher than the side surface of each support section. A through hole is provided on at least one of the support sections and horizontally passes through the protrusion. Each protrusion is embedded by means of dual material injection in the elastic band.

When the electronic device is erected on a plane, the rigid swing arms can support the weight of the electronic device. When the electronic device is hand-held by a user, the elastic band can be elastically deformed to adapt to user palms in different sizes.

DETAILED DESCRIPTION OF THE EMBODIMENTS

Figure 1:
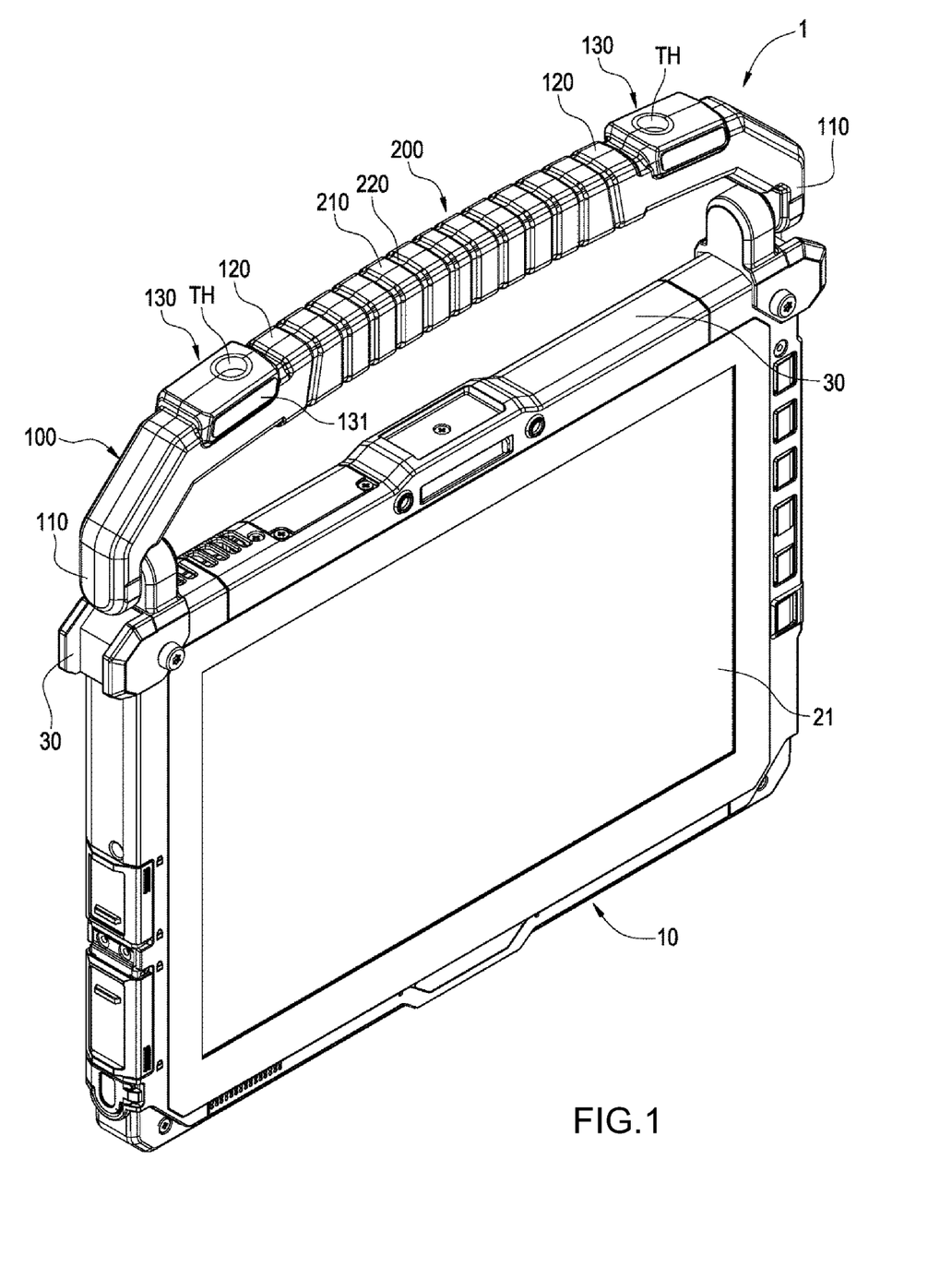
FIG. 1 to FIG. 6 are schematic diagrams of various states of use of a handle according to a preferred embodiment of the present invention.
Figure 2:
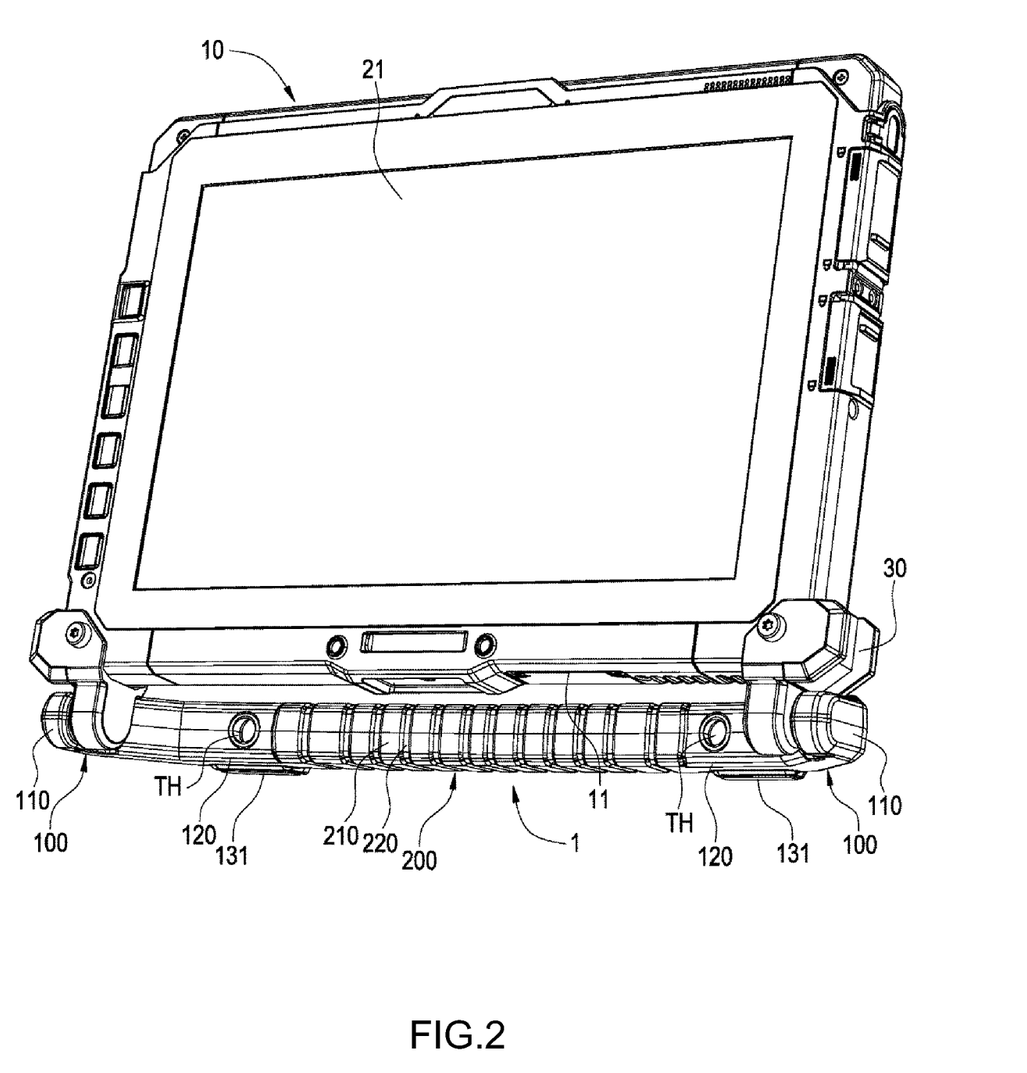
Figure 3:
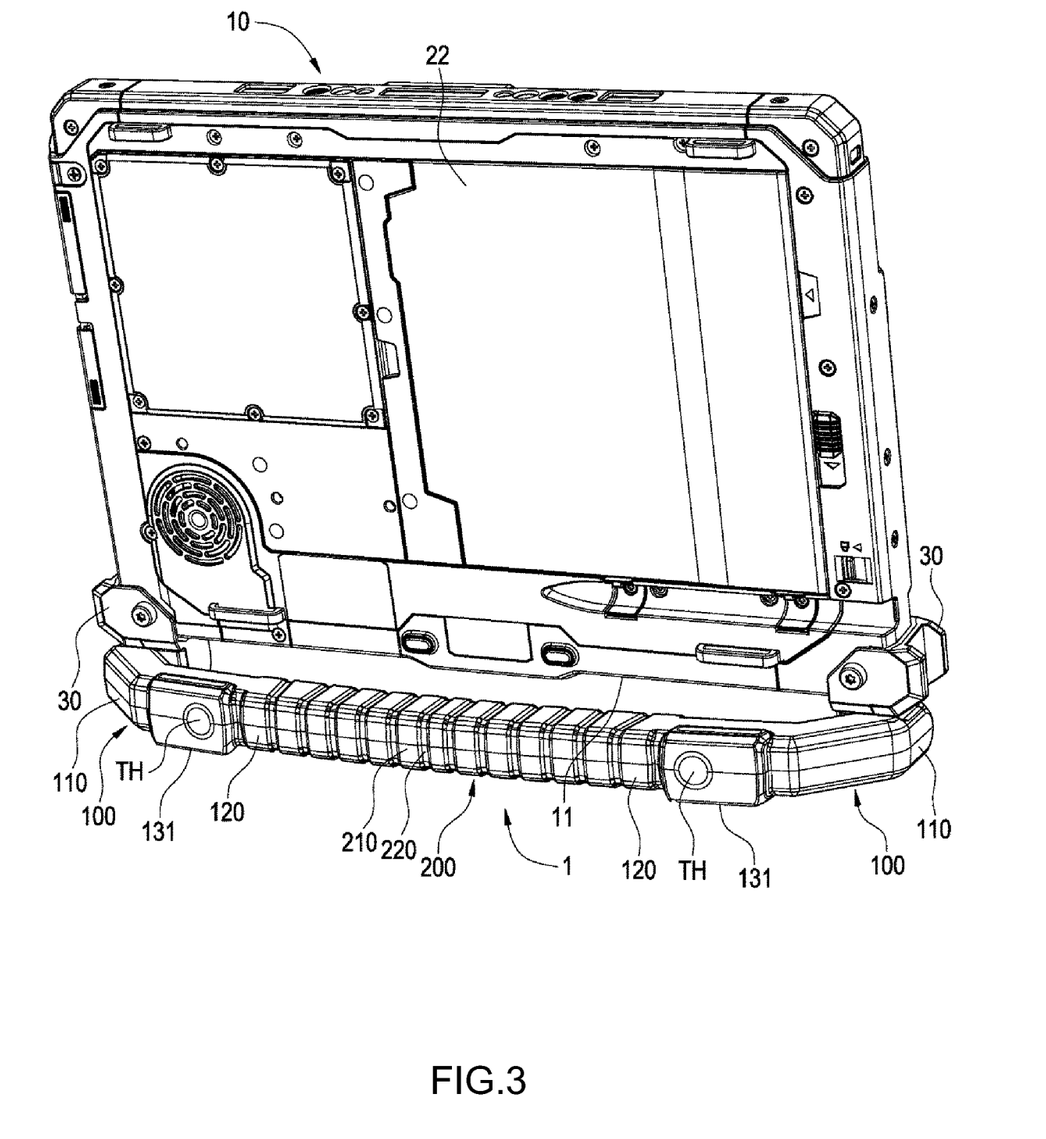

Referring to FIG. 1 to FIG. 3, a handle 1 is provided according to a preferred embodiment of the present invention. The handle 1 is pivotally configured on a mounting side 11 of an electronic device 10 to support or to hand-hold the electronic device 10. The electronic device 10 is plate-like and is preferably a tablet computer, and an electrical connection side 12 thereof is provided with an electrical connector or a plurality of electrical connection terminals for electrically connecting to a transmission dock or another electronic device. The mounting side 11 is provided on the opposite side of the electrical connection side 12 of the tablet computer. However, the present invention is not limited to the above example. Two sides of the electronic device 10 are respectively a display surface 21 and a back surface 22, and the electronic device 10 is provided with at least one stopping portion 30.

Figure 4:
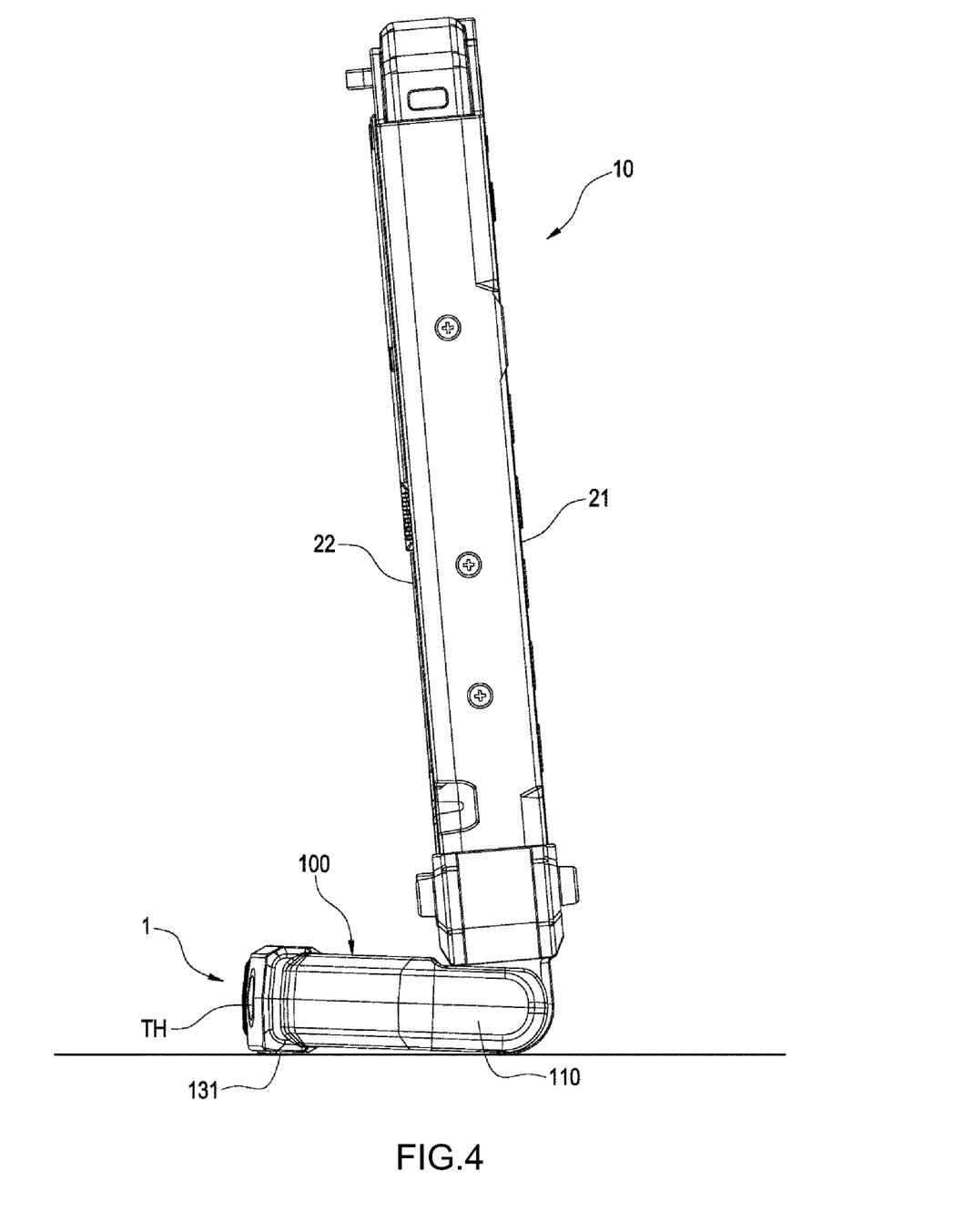
Figure 5:
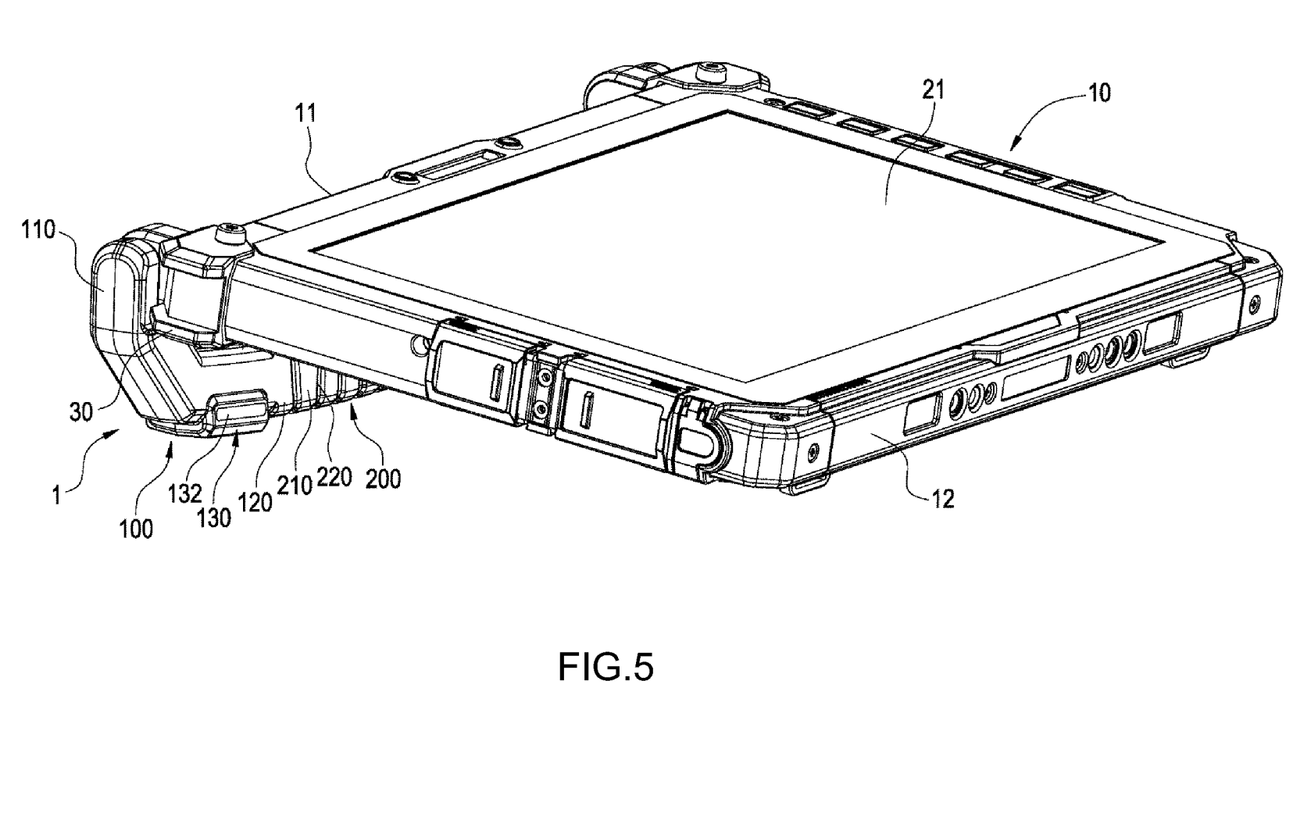
Figure 6:
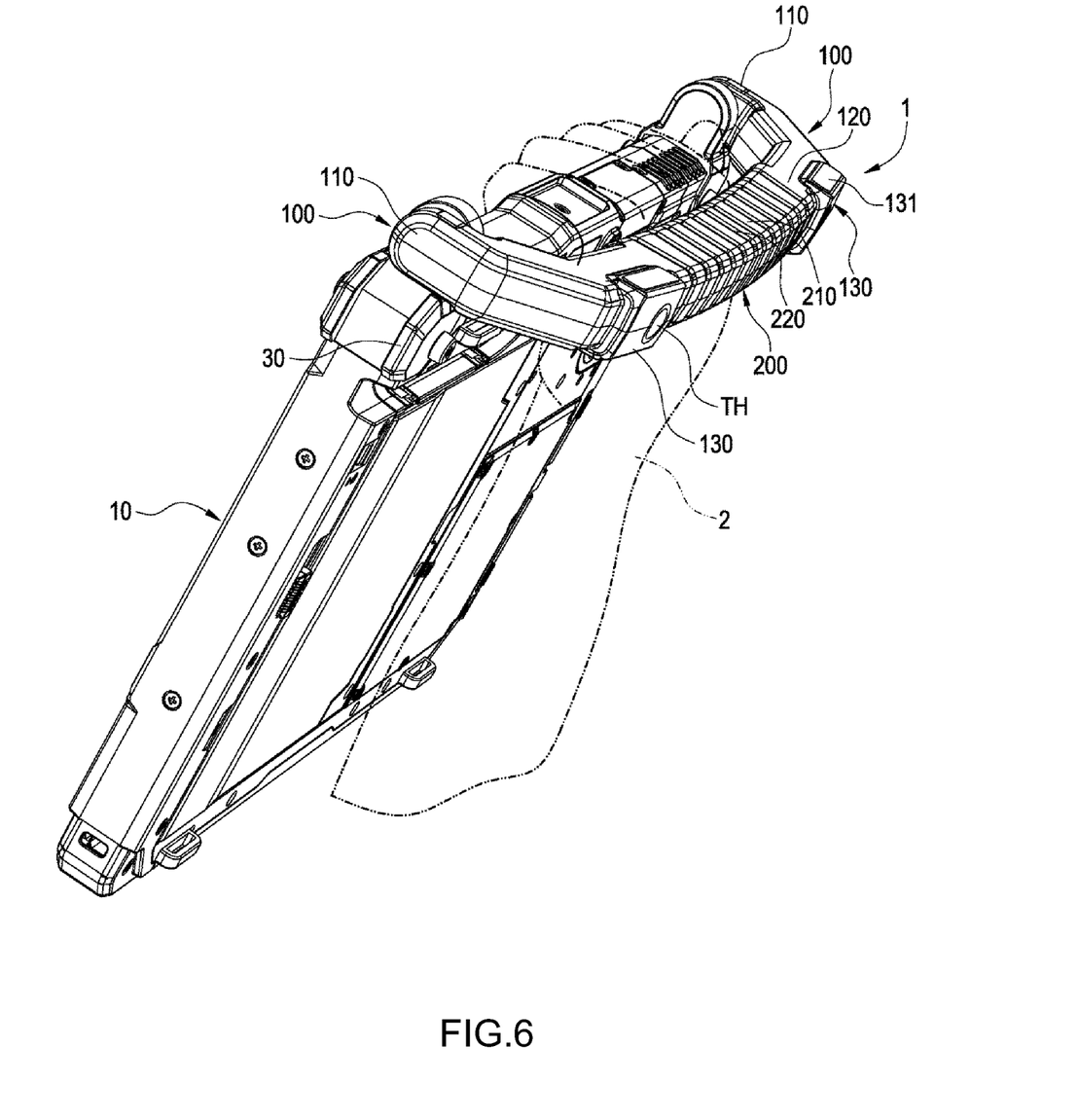

For example, as shown in FIG. 1, the handle 1 can be hand-held by a user to lift the electronic device 10. When the handle 1 is pivotally turned to the back surface 22 located at the electronic device 10 as shown in FIG. 2 and FIG. 3, the handle 1 can support the electronic device 10 such that the electronic device 10 can be erected on the plane on which the electronic device 10 is placed, as shown in FIG. 4. For example, the electronic device 10 can be placed on a plane of placement. For example, as shown in FIG. 5, the electronic device 10 is placed horizontally and is supported by the handle 1 to become facing upwards. Further, for example, as shown in FIG. 6, the user can pass a palm 2 between the handle 1 and the electronic device 10 to hold the electronic device 10, and the palm 2 is retained by an elastic restoring force of the handle 1 to prevent the palm 2 from slipping off.

Figure 7:
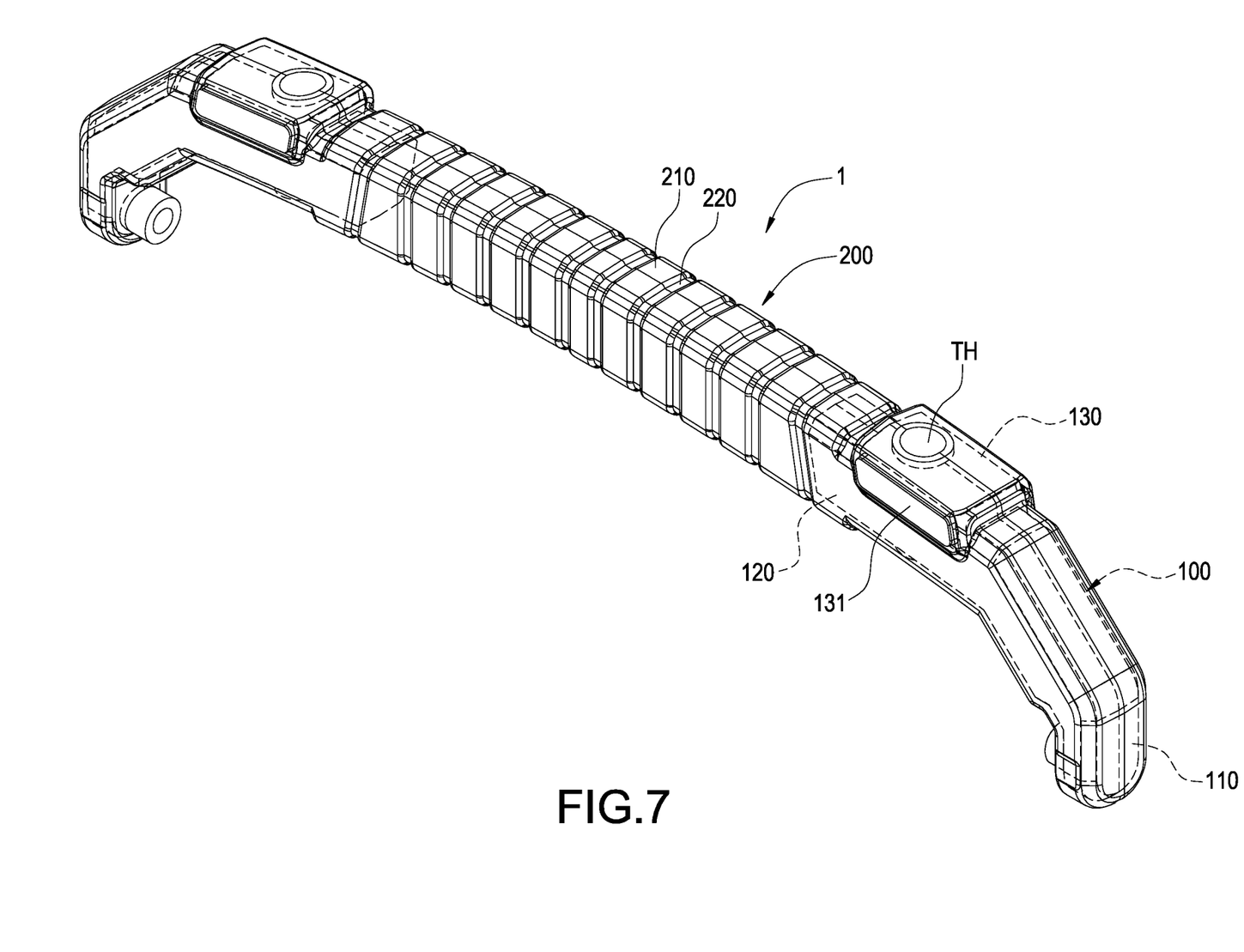
FIG. 7 is a perspective schematic diagram of a handle according to a preferred embodiment of the present invention.
Figure 8:
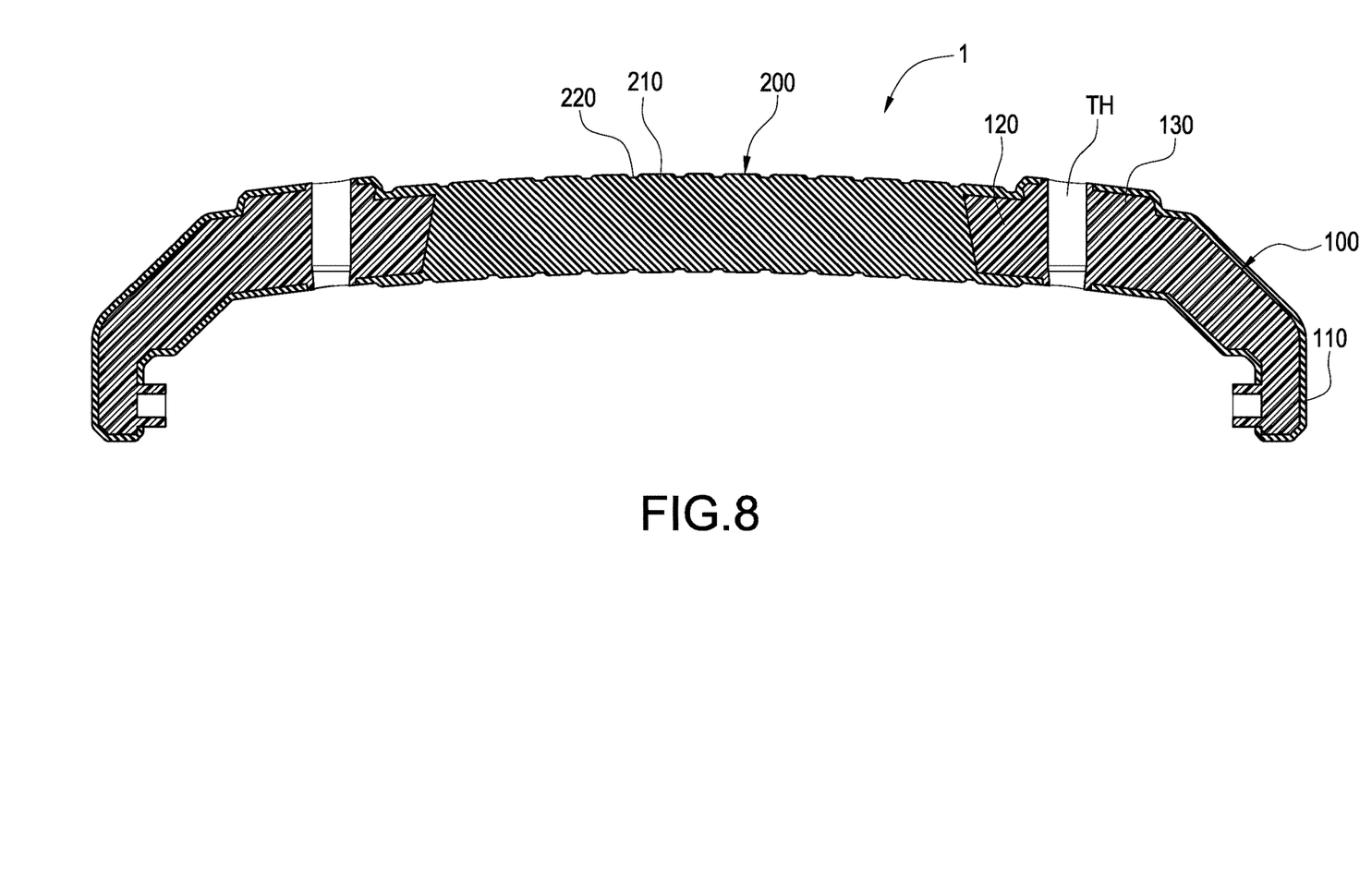
FIG. 8 is a section diagram of a handle according to a preferred embodiment of the present invention.
Figure 9:
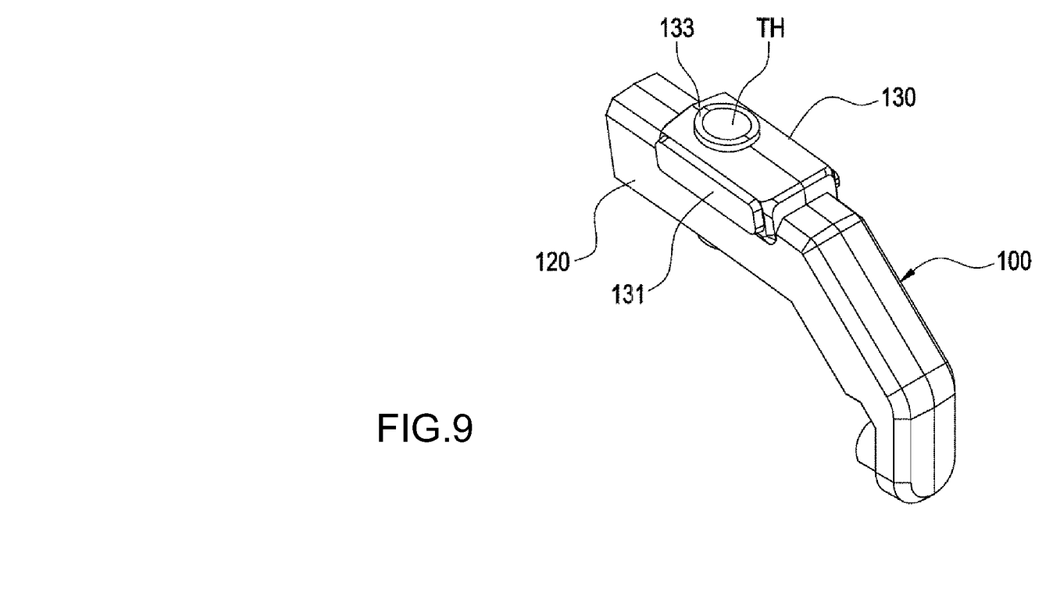
FIG. 9 is a perspective schematic diagram of a rigid swing arm of a handle according to a preferred embodiment of the present invention.
Figure 10:
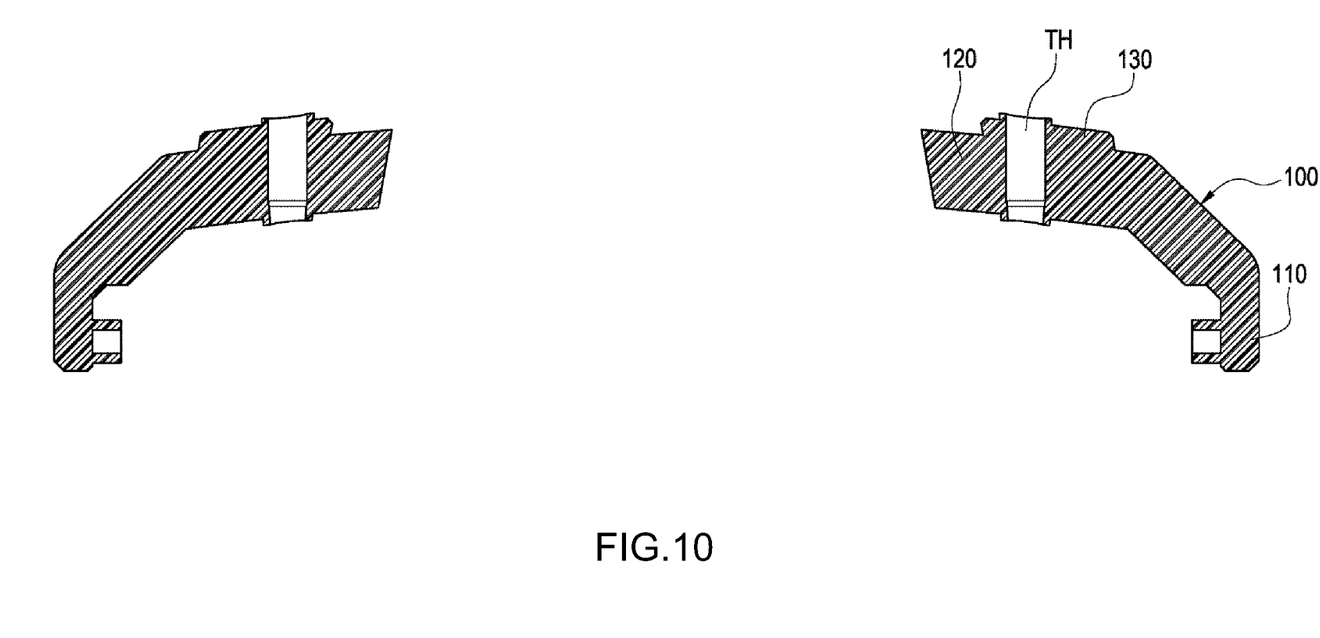
FIG. 10 is a section diagram of a rigid swing arm of a handle according to a preferred embodiment of the present invention.
Figure 11:
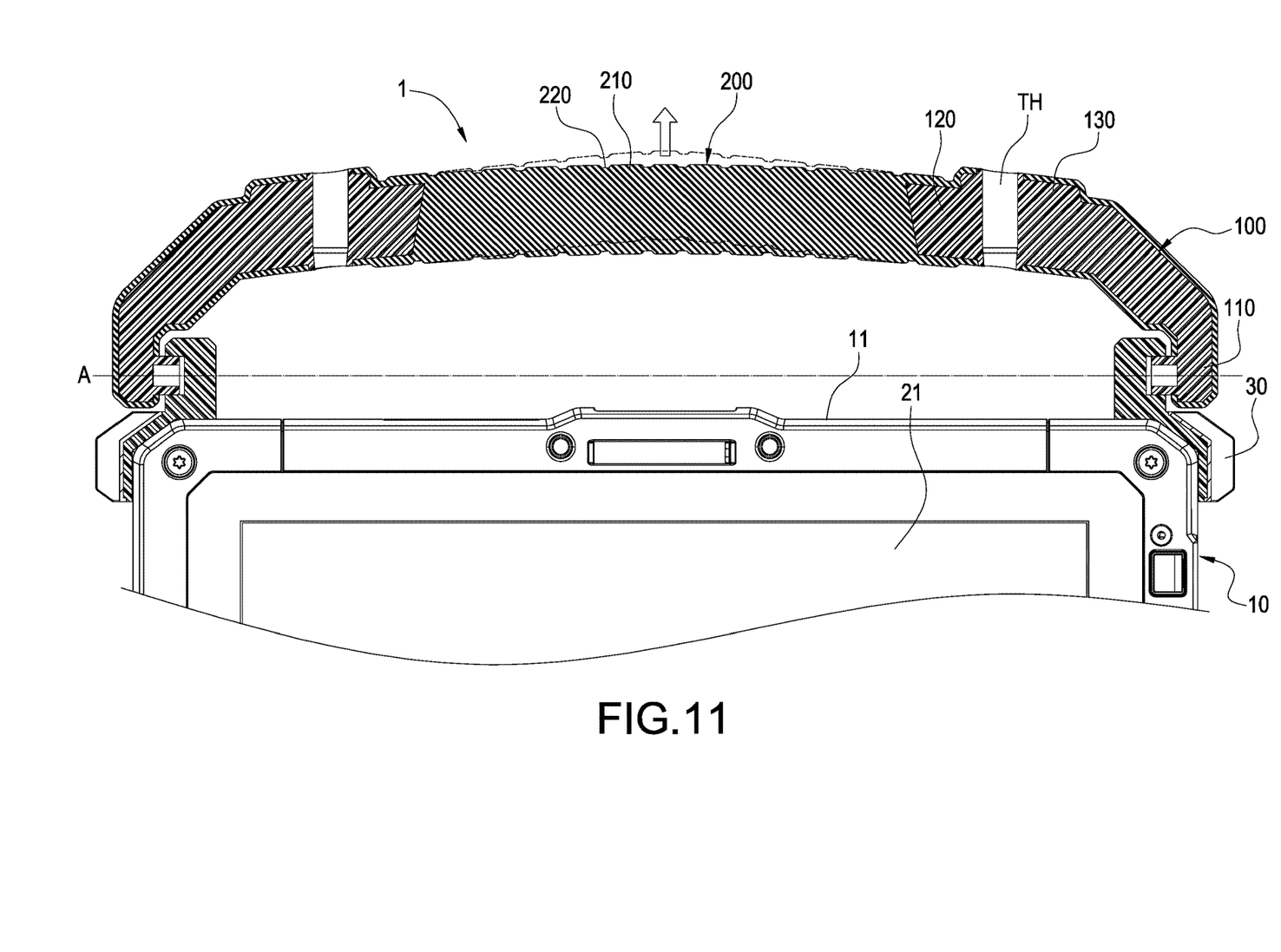
FIG. 11 is a schematic diagram of an elastically deformed elastic band of a handle according to a preferred embodiment of the present invention.

Referring to FIG. 7, FIG. 8 and FIG. 11, in this embodiment, the handle 1 of the present invention includes a pair of rigid swing arms 100 and an elastic band 200. Referring to FIG. 9 to FIG. 11, the pair of rigid swing arms 100 are in a spaced arrangement. One end of each rigid swing arm 100 is a pivot end 110, and each pivot end 110 is pivotally connected to the foregoing mounting side 11 along the same pivot axis A. The pair of rigid swing arms 100 are preferably, for example but not limited to, respectively pivotally connected to two ends of the mounting side 11, or pivotally connected between two ends of the mounting side 11. Further, the pair of rigid swing arms 100 extend and bend in opposite from the pivot ends 110 to form respective support sections 120.

Referring to FIG. 2 to FIG. 5, when the handle 1 is pivotally turned to the back surface 22 located at the electronic device 10, the stopping portion 30 on the electronic device 10 is abutted against any rigid swing arm 100 and fixes the position of the handle 1. Further, the support sections 120 of the rigid swing arms 100 are respectively abutted against the plane of placement. Thus, the electronic device 10 is supported and accordingly erected on the plane of placement.

Referring to FIG. 7, FIG. 8 and FIG. 11, the elastic band 200 extends and is connected between the pair of rigid swing arms 100, and more specifically, the elastic band 200 extends and is connected between the pair of support sections 120. In this embodiment, the elastic band 200 is preferably includes a plurality of blocks 210. The blocks 210 are arranged between the support sections 120 of the pair of rigid swing arms 100, and the adjacent blocks 210 are connected by respectively connecting sections 220 in between. Each connecting section 220 is preferably narrower than the blocks 210 and is hence recessed in the gap between the adjacent blocks 210. As such, because the blocks 210 are capable of supporting the elastic band 200, the shape of the elastic band 200 can be maintained, and a corresponding section of the elastic band 200 can be elastically deformed to tolerate the relative displacement of the blocks 210 to further change relative arranged positions of the blocks 210. When the elastic band 200 between the rigid swing arms 100 receives a sufficient lateral external force, the section of elastic band 200 can be elastically deformed by bending these connection sections 220. Preferably, the support sections 120 of the pair of rigid swing arms 100 are individually embedded by means of dual material injection in the elastic band 200, and the elastic band 200 can be radially deformed along the pivot axis A by using the part that is not embedded in the pair of rigid swing arms 100. When the weight of the electronic device 10 is applied on the handle 1, the elastic band 200 maintains an original shape by using the respective support sections 120 of the pair of rigid swing arms 100.

Preferably, a side surface of each support section 120 can be selectively provided with a protrusion 130 in a projecting manner. Each protrusion 130 projects from and is higher than the side surface of the support section 120. More specifically, each protrusion 130 is located on an outer side of the support section 120, and radially and circumferentially projects outwards along the pivot axis A and thus projects from the surface of the support section 120. Further, each protrusion 130 radially projects outwards along the pivot axis A by a flange 133, and projects outwards along two circumferentially directions by a first exposed portion 131 and a second exposed portion 132 for a mold to clamp the rigid swing arm 100 during dual material injection. In other words, with the first exposed portion 131 and the second exposed portion 132 clamped at the rigid swing arms 100, the rigid swing arms 100 can be suspended in the mold.

In this embodiment, when a soft material of the elastic band 200 is enveloped in the protrusion 130, the soft material is stopped at an edge of the flange 133 made of a hard material. However, in other embodiments, the protrusion 130 does not include the foregoing flange 133, and the soft material of the elastic band 200 and the hard material of the protrusion 130 are together stopped at a through hole TH. In this embodiment, the first exposed portion 131 and the second exposed portion 132 are both exposed from the soft material, and the exposed area of the first exposed portion 131 is noticeably greater than the exposed area of the second exposed portion 132. Compared to an outer surface of the second exposed portion 132 formed by an exposed surface aligned with the soft material, the exposed surface of the first exposed portion 131 is slightly upheaved and projects from the outer surface formed by a soft material. Further, when the handle 1 is mounted, the first exposed portion 131 and the display surface 21 are on the same side, and the second exposed portion 132 and the back surface 22 are on the same side.

When the electronic device 10 is erected on the plane and has a tilted angle from the plane, the surface exposed by using the first exposed portion 131 at a position away from the pivot axis A as much as possible can serve as a support footpad, such that the handle 1 can use the first exposed portion 131 to provide a rotational inertia or moment of inertia, which is formed by using the first exposed portion 31 as a fulcrum and sufficient for supporting the center of mass the electronic device 10. Because the first exposed portion 131 is away from a casting point of the center of mass of the electronic device 10 on the plane, when an operator uses the touch function of the electronic device 10 and acts against the display surface 21, the handle 1 can also use the first exposed portion 131 to provide a sufficient counter force, in a way that the electronic device 10 is not topped over.

When the electronic device 10 is erected on the plane, the projecting first exposed portion 131 serves as a footpad, such that the handle 1 is in contact with the plane by only two end edges of the first exposed portion 131 and the pivot ends 110, with the remaining parts essentially suspended. Further, the electronic device 10 uses the end edges of the stopping portions 30 to contact the support plane, and so unevenness of the handle caused by manufacturing tolerances of the contact plane as a result of an excessive number of contact points can be avoided, while providing the electronic device 10 with enough support. Further, each protrusion 130 is embedded by means of dual material injection in the soft material of the elastic band 200. At least one of the support sections 120 can be selectively provided with a horizontal through hole TH, and the through hole TH preferably horizontally passes through the protrusion 130 and is positioned at a predetermined support point (i.e., the first exposed portion 131). The through hole TH can be inserted by a rod (not shown), thereby extending the distance between the support point and the center of mass of the electronic device 10 to more stably support the electronic device 10. The form of the rod is not limited by the present invention, for example, a common pen rod or an included stylus is one of the most common forms.

As shown in FIG. 1, when the handle 1 is pivotally turned to locate on the same plane as the electronic device 10, a user can hand-hold the elastic band 200 between the pair of rigid swing arms 100 to lift the electronic device 10. As shown in FIG. 6 and FIG. 11, when the handle 1 is pivotally turned to the back surface 22 located at the electronic device 10, the user can pass a palm 2 between the elastic band 200 and the electronic device 10 to thus hold the electronic device 10. Further, the palm 2 is retained by an elastic restoring force of the elastic band 200 and prevented from slipping off. The rigid swing arms 100 provide sufficient structural rigidity when the electronic device 10 is lifted or supported, and the required structural rigidity when falling tests are conducted for the electronic device 10 and the handle 1 can also be provided by the rigid swing arms 100. A predetermined distance between the elastic band 200 and a mounting side 11 of the electronic device 10 is designed to match a user having a palm 2 in a smaller size. To match a user having a palm 2 in a larger size, the elastic band 2 can be stretched outwards by the palm 2 and become elastically deformed, thereby adapting to the user palms 2 in different sizes.

In conclusion, the handle 1 of the present invention includes the rigid swing arms 100 and the elastic band 200 combined in one by means of dual material injection. When the electronic device 10 is erected on a plane, the rigid swing arms 100 can be used to support the weight of the electronic device 10. When the electronic device 10 is hand-held by a user, the elastic band 200 can be elastically deformed to adapt to users having palms 2 in different sizes. Therefore, the handle 1 of the present invention can be used for both supporting and retaining, and can also adapt to the palms 2 in different sizes.

The description is merely preferred embodiments of the present invention and is not to be construed as limitations to the claim scope of the present invention. Other equivalent modifications practicing the inventive spirit of the present invention are to be encompassed within the claim scope of the present invention.

What is claimed is:

1. A handle, adapted to be pivotally configured on a mounting side of an electronic device, comprising:
   a pair of rigid swing arms, individually pivotally connected to the mounting side along a same pivot axis; and
   an elastic band, connected between the pair or rigid swing arms;
   wherein two sides of the electronic device are respectively a display surface and a back surface, the electronic device is provided with a stopping portion, and when the handle is pivotally turned to the back surface located at the electronic device, the stopping portion is abutted against one of the rigid swing arms and fixes a position of the handle.

2. The handle according to claim 1, wherein the elastic band comprises a plurality of blocks in a spaced arrangement, and a plurality of connecting sections respectively connected between the adjacent blocks.

3. The handle according to claim 1, wherein the pair of rigid swing arms are individually embedded by dual material injection in the elastic band, and the elastic band is radially deformed along the pivot axis by using a part that is not embedded in the pair of rigid swing arms.

4. The handle according to claim 3, wherein when a weight of the electronic device is applied on the handle, the elastic band maintains an original shape by using the pair of rigid swing arms.

5. The handle according to claim 1, wherein one end of each of the pair of rigid swing arms is a pivot end, each pivot end is pivotally connected to the electronic device, the pair of rigid swing arms bend and extend in opposite directions toward each other from the respective pivot ends to form respective support sections, and the elastic band extends and is connected between the pair of support sections.

6. The handle according to claim 5, wherein a side surface of each support section is provided with a protrusion in a projecting manner.

7. The handle according to claim 5, wherein a through hole is horizontally provided on at least one of the support sections.

8. The handle according to claim 5, wherein the support sections are individually embedded by means of dual material injection in the elastic band, and the elastic band is radially deformed along the pivot axis by using a part that is not embedded in the support sections.

9. The handle according to claim 8, wherein when a weight of the electronic device is applied on the handle, the elastic band maintains an original shape by each support section.

10. The handle according to claim 9, wherein the protrusions respectively protrude from and are higher than side surfaces of the respective support sections.

11. The handle according to claim 9, wherein a through hole horizontally passing through the protrusion is provided on at least one of the support sections.

12. The handle according to claim 9, wherein the protrusions are individually embedded by means of double material injections in the elastic band.

13. A handle, adapted to be pivotally configured on a mounting side of an electronic device, comprising:
    a pair of rigid swing arms, individually pivotally connected to the mounting side along a same pivot axis; and
    an elastic band, connected between the pair or rigid swing arms;
    wherein the pair of rigid swing arms are individually embedded by dual material injection in the elastic band, and the elastic band is radially deformed along the pivot axis by using a part that is not embedded in the pair of rigid swing arms.

14. The handle according to claim 13, wherein the elastic band comprises a plurality of blocks in a spaced arrangement, and a plurality of connecting sections respectively connected between the adjacent blocks.

15. The handle according to claim 13, wherein when a weight of the electronic device is applied on the handle, the elastic band maintains an original shape by using the pair of rigid swing arms.

16. The handle according to claim 13, wherein one end of each of the pair of rigid swing arms is a pivot end, each pivot end is pivotally connected to the electronic device, the pair of rigid swing arms bend and extend in opposite directions toward each other from the respective pivot ends to form respective support sections, and the elastic band extends and is connected between the pair of support sections.

17. The handle according to claim 16, wherein a side surface of each support section is provided with a protrusion in a projecting manner.

18. The handle according to claim 16, wherein a through hole is horizontally provided on at least one of the support sections.

19. The handle according to claim 16, wherein the support sections are individually embedded by means of dual material injection in the elastic band, and the elastic band is radially deformed along the pivot axis by using a part that is not embedded in the support sections.

20. The handle according to claim 19, wherein when a weight of the electronic device is applied on the handle, the elastic band maintains an original shape by each support section.

* * * * *